United States Patent Office 2,974,012
Patented Mar. 7, 1961

2,974,012

PREPARATION OF BERYLLIUM OXIDE OF HIGH PURITY

Raymond Cooperstein and Gary R. Anderson, Cincinnati, Ohio, assignors to the United States of America as represented by the United States Atomic Energy Commission No Drawing. Filed July 10, 1959, Ser. No. 826,384

4 Claims. (Cl. 23—183)

The present invention relates to an improved process for making beryllium oxide of high purity. More specifically, the invention relates to a process for preparing beryllium oxide which involves the conversion of beryllium compounds, such as the hydroxide, oxide, carbonate, sulfate or nitrate to beryllium oxalate, and subsequent treatment of the beryllium oxalate so as to recover beryllium as the oxide free from the impurities normally associated with commercialy obtainable beryllium oxide.

Numerous processes have in the past been suggested for the recovery of beryllium oxide from beryllium containing ores. A notable defect in almost all of these prior methods is that they require many time consuming and expensive process steps. A further drawback is that, even after these tedious process steps, large and objectionable amounts of impurities remain. Beryllium oxide is generally prepared by the thermal decomposition of beryllium sulfate or hydroxide. The sulfate is usually made by a recrystallization technique while the hydroxide is generally prepared by the direct addition of an alkaline hydroxide solution to a solution of a beryllium salt, such as beryllium sulfate. These beryllium compounds, when calcined, form beryllium oxide powders which almost always contain high concentrations of impurities.

Beryllium metal produced from such contaminated beryllia will obviously contain most of the impurities associated with the beryllia, with consequent undesirable results. Furthermore, if it is desired to fabricate ceramic bodies from the beryllium oxide by powder processing techniques and sintering, or by other ceramic forming methods, then the use of impure beryllium oxide is undesirable. This is particularly so if the beryllia ceramic pieces are intended for use as components of a nuclear reactor, since both the nuclear properties and the degree of shrinkage on sintering depend on the amount and the nature of the impurities in the beryllium oxide powder. The purity of presently obtainable commercial beryllia is found to vary quite markedly from lot to lot, with the result that ceramic bodies, formed under standardized process conditions, vary a great deal as to nuclear characteristics and sinterability.

It is therefore an object of the present invention to provide a method for the production of beryllium oxide of extremely high purity.

It is a further object of the present invention to provide an improved method for the production of beryllium oxide of high purity that eliminates many of the tedious and expensive process steps used in prior methods.

It is yet another object of this invention to provide a method for producing beryllium oxide suitable for use in fabricating beryllia shapes by conventional ceramic forming techniques.

Various other objects and advantages of the invention will become apparent in the course of this description.

The process consists essentially in reacting molten oxalic acid with a beryllium compound to form beryllium oxalate ($BeC_2O_4 \cdot 3H_2O$), which when pyrolyzed at a suitable relatively low temperature, in the presence of air or other gaseous oxidizing medium, will burn to form highly active beryllia particles of small crystallite size, together with carbon dioxide, carbon monoxide and water vapor. The commonly associated mineral impurities are separated from the beryllium values after conversion of the beryllium to the oxalate and before the oxalate is converted to beryllia. This purification is accomplished simply and efficiently by leaching the beryllium oxalate mass with water or a suitable organic solvent so as to dissolve the beryllium oxalate while the insoluble impurities remain. The beryllium oxalate is then recovered from the leaching solution by cooling and crystallization, and the now purified oxalate salt is finally pyrolyzed to pure beryllia.

Oxalic acid is melted by heating the crystalline material to 120° C. Beryllium hydroxide is then reacted with the molten oxalic acid by adding the hydroxide to the molten acid and stirring. The addition of the hydroxide results in a vigorously exothermic reaction so that the continued application of heat to the reaction vessel is unnecessary.

The suggested mole ratio of crude hydroxide to oxalic acid should be of the order of one to one. The molten reaction mixture is allowed to cool and solidify, and the solidified cake is then heated in a suitable solvent to a temperature of between 50 to 95° C., and the hot mixture is filtered. Appropriate organic solvents, such as dioxane, benzene, toluene and xylene, may be employed for the dissolution step, but water is also suitable, and economic considerations may dictate its use. The residue from the filtration step will be composed of unreacted hydroxides and the more insoluble oxalates of the impurities associated with the initial beryllium-bearing material.

The hot filtrate solution is collected in a vessel cooled to less than 4° C., which results in a rapid crystallization of beryllium oxalate. The beryllium is recovered by filtering, dried and stored for the pyrolysis operation. The filtered leach solution, now depleted of the major portion of its beryllium oxalate, is then reheated and recycled through the undissolved residue, and the crystallization process is repeated. Thus, the beryllium oxalate yield is increased while the necessity for use of excessive volumes of solvent is eliminated. The economic importance of this becomes more apparent when organic solvents are employed for the leaching treatment.

The dried beryllium oxalate is then pyrolyzed at a temperature of between 800° C. and 1000° C. for a period of between four and ten hours to ensure complete conversion of the oxalate to the oxide. The rate of rise to the pyrolysis temperature (800°–1000° C.) is between 100° and 300° C. per hour.

The following examples gives further details of how the process outlined above has been carried out.

EXAMPLE I 2268 parts by weight of oxalic acid was fused in a container and to it was added 648 parts by weight of beryllium hydroxide. The beryllium oxalate mass thus produced was leached with water. From the purified beryllium oxalate which was recrystallized from the leach solution there was recovered a 60% yield of purified beryllium oxide after pyrolysis.

EXAMPLE II 2268 parts by weight of oxalic acid was fused in a container and to it was added 400 parts by weight of beryllium oxide that was too impure for use in a nuclear reactor. The beryllium oxalate mass thus produced was leached with water. From the purified beryllium oxalate which was recrystallized from the leach solution there was obtained a 72% yield of purified beryllium oxide after pyrolysis.

EXAMPLE III 630 parts by weight of oxalic acid was fused in a container and to it was added 530 parts by weight of $BeSO_4$—$4H_2O$. The beryllium oxalate mass thus produced was leached with water. From the purified beryllium oxalate which was recrystallized from the leach solution there was obtained a 67% yield of purified beryllium oxide after pyrolysis.

EXAMPLE IV

The procedure indicated in Example III was repeated, but the beryllium oxalate mass thus produced was leached with a 50-50 volume mixture of toluene and isopropyl alcohol instead of using water. From the purified berylium oxalate that was recrystallized from the leach solution there was obtained at 67% yield of purified beryllium oxide after pyrolysis.

To indicate the vast improvement in beryllia purity made possible by the use of this method, Table I shows the general level of impurities remaining in beryllia made by the process of this invention, and compares it with a specification for maximum impurities in beryllium oxide, curerntly accepted for use in nuclear reactors.

*Table I*

| Impurity | Nuclear Reactor Specifications Maximum Impurities, Parts per million | Impurities after Purification by Present Process, parts per million |
|---|---|---|
| Aluminum | 600 | 20 |
| Boron | 3 | 1.5 |
| Calcium | 2,000 | 90 |
| Chromium | 200 | 12 |
| Iron | 200 | 15 |
| Magnesium | 5,000 | 10 |
| Manganese | 300 | 1 |
| Sodium | 5,000 | 30 |
| Nickel | 50 | 3 |
| Silicon | 600 | 55 |

The recovered beryllium oxide is of such extremely high purity and reactivity that it lends itself to a variety of new uses and applications. Specifically, such pure peryllia is a particularly desirable starting material for the production of ceramic bodies or metallic beryllium.

While we have specified pyrolyzing the beryllium oxalate in air and while the simplicity of this operation and the equipment employed commend themselves where large scale commercial operations are contemplated, it will be understood that the decomposition of the oxalate to form beryllium oxide may be carried out with other gaseous oxidizing agents, such as oxygen gas, mixtures of oxygen and inert gases, and nitrogen dioxide gas.

It will moreover be understood that the essential reactions may be carried out unded widely varying operating conditions and with diverse types of apparatus, and that various changes in the details of the procedure may be made without departing from the invention, which is not to be deemed as limited otherwise than as indicated by the scope of the appended claims.

We claim:
1. A process for preparing beryllium oxide of high purity which comprises reacting a beryllium compound selected from the group consisting of beryllium oxide, beryllium hydroxide, beryllium sulfate, beryllium carbonate and beryllium nitrate with molten oxalic acid to produce beryllium oxalate, leaching the reaction mass with water to recover beryllium oxalate from the associated impurities, filtering said leach solution to separate it from unreacted beryllium compound and the more insoluable oxalates, cooling the leach solution to crystallize the beryllium oxalate, recovering the beryllium oxalate by filtration and subsequently converting the beryllium oxalate to beryllium oxide by pyrolysis.

2. A process for preparing beryllium oxide of high purity which comprises reacting beryllium oxide of low purity with molten oxalic acid to produce beryllium oxalate, leaching the reaction mass with water at 50° to 95° C. to recover beryllium oxalate from the associated impurities, filtering the leach solution to separate impurities therefrom, cooling the leach solution to crystallize the beryllium oxalate, recovering the beryllium oxalate by filtration, and subsequently converting the beryllium oxalate to beryllium oxide by pyrolysis.

3. A process as recited in claim 2 in which the pyrolysis is carried out at a temperature between 800° C. and 1000° C.

4. A process for preparing beryllium oxide of high purity which comprises reacting beryllium hydroxide with molten oxalic acid to produce beryllium oxalate, leaching the reaction mass with water at 50° to 95° C. to recover beryllium oxalate from the associated impurities, filtering the leach solution to separate impurities therefrom, cooling the leach solution to crystallize the beryllium oxalate, recovering the beryllium oxalate by filtration and subsequently converting the beryllium oxalate to beryllium oxide by pyrolysis.

References Cited in the file of this patent

Mellor: "A Comprehensive Treatise on Inorganic and Theoretical Chemistry," vol. 4 (1923), page 221.
Jacobson: "Encyclopedia of Chemical Reactions," vol. 1 (1946), page 610.